United States Patent
Ferrero

(10) Patent No.: US 10,076,777 B2
(45) Date of Patent: Sep. 18, 2018

(54) PROCESS FOR TREATING CONTAMINATED SUBSOIL

(71) Applicant: CARSICO S.R.L., Bruino (IT)

(72) Inventor: Alessandro Ferrero, Bruino (IT)

(73) Assignee: CARSICO S.R.L., Bruino (IT)

( * ) Notice: Subject to any disclaimer, the term of this patent is extended or adjusted under 35 U.S.C. 154(b) by 0 days.

(21) Appl. No.: 15/322,148

(22) PCT Filed: Jun. 18, 2015

(86) PCT No.: PCT/IT2015/000156
§ 371 (c)(1),
(2) Date: Dec. 26, 2016

(87) PCT Pub. No.: WO2016/001941
PCT Pub. Date: Jan. 7, 2016

(65) Prior Publication Data
US 2017/0128991 A1    May 11, 2017

(30) Foreign Application Priority Data
Jun. 30, 2014   (IT) .............................. TO2014A0520

(51) Int. Cl.
*B09C 1/02*    (2006.01)
*B09C 1/08*    (2006.01)
*B09C 1/00*    (2006.01)

(52) U.S. Cl.
CPC ................. *B09C 1/08* (2013.01); *B09C 1/02* (2013.01); *B09C 1/002* (2013.01); *B09C 1/005* (2013.01); *B09C 2101/00* (2013.01)

(58) Field of Classification Search
CPC ........... B09C 1/002; B09C 1/005; B09C 1/02; B09C 2101/00
See application file for complete search history.

(56) References Cited

U.S. PATENT DOCUMENTS

| 4,442,895 A | 4/1984 | Lagus et al. |
| 5,133,625 A | 7/1992 | Albergo et al. |
| (Continued) | | |

FOREIGN PATENT DOCUMENTS

| EP | 0623708 B1 | 1/1998 |
| FR | 2444873 A1 | 7/1980 |
| (Continued) | | |

OTHER PUBLICATIONS

International Search Report dated Sep. 25, 2015 for International Application No. PCT/IT2015/000156 filed Jun. 18, 2015.

*Primary Examiner* — Frederick Lyndon Lagman
(74) *Attorney, Agent, or Firm* — Avery N. Goldstein; Blue Filament Law, PLLC

(57) ABSTRACT

A process for treating contaminated subsoil is provided that includes arranging at least one hole in contaminated subsoil, inserting at least one piping into the at least one hole, the at least one piping being longitudinally equipped with at least one first valve; inserting or arranging at least one injecting means into the at least one piping, and injecting at least one fluid into the contaminated subsoil through the at least one injecting means and next to the at least one first valve in open configuration; and removing possible residuals present in the at least one piping following the injection of the at least one fluid.

10 Claims, 5 Drawing Sheets

(56) References Cited

U.S. PATENT DOCUMENTS

| | | | | |
|---|---|---|---|---|
| 5,190,405 A | * | 3/1993 | Vinegar | B09C 1/005 405/128.4 |
| 5,266,213 A | | 11/1993 | Gillham | |
| 5,560,737 A | * | 10/1996 | Schuring | B09C 1/00 166/246 |
| 5,624,209 A | | 4/1997 | Melegari | |
| 5,709,505 A | * | 1/1998 | Williams | B09C 1/005 166/268 |
| 5,908,267 A | * | 6/1999 | Schuring | B09C 1/00 166/308.1 |
| 6,305,473 B1 | * | 10/2001 | Peramaki | B09C 1/00 166/313 |
| 6,312,605 B1 | * | 11/2001 | Kerfoot | B01F 3/04262 166/250.02 |
| 6,352,387 B1 | * | 3/2002 | Briggs | B09C 1/00 166/306 |
| 7,845,883 B1 | * | 12/2010 | Siler, III | B09C 1/002 166/270.1 |
| 2004/0238459 A1 | * | 12/2004 | Whisman, III | B09C 1/002 210/759 |

FOREIGN PATENT DOCUMENTS

| | | | | |
|---|---|---|---|---|
| FR | 2552462 A1 | | 3/1985 | |
| JP | 2003340428 A | * | 12/2003 | B09C 1/00 |
| JP | 2010063978 A | * | 3/2010 | B09C 1/002 |
| WO | 2008123674 A1 | | 10/2008 | |

* cited by examiner

PROCESS FOR TREATING CONTAMINATED SUBSOIL

CROSS-REFERENCE TO RELATED APPLICATIONS

This application is a non-provisional application that claims priority benefit of International Application Serial Number PCT/IT2015/000156 filed 18 Jun. 2015, which in turn claims priority benefit of Italian Application Serial Number TO2014A000520 filed 30 Jun. 2014; the contents of both are hereby incorporated by reference.

FIELD OF THE INVENTION

The present invention refers to a process for treating contaminated subsoil, and in particular contaminated aquifers and/or capillary fringes.

BACKGROUND OF THE INVENTION

It is known that the subsoil, and in particular aquifers, are characterized by the presence of compounds having natural or anthropic origin, whose persistence for prolonged times can generate health problems. Within multiple anthropic activities, such as for example industrial activities, or agricultural activities, or mining activities, the production of polluting compounds is high, and above all in the steps of transforming, transporting or storing raw materials, both organic compounds (lubricating oil, fuels, chlorinated solvents, monocyclic and polycyclic aromatic compounds, dioxins, polychlorobiphenils, etc.), and inorganic compounds (heavy metals, ionic compounds) are spread in the environment. In particular, agricultural and breeding practices can compromise the environment quality following the use of pesticides, fungicides, nitrates, phosphates, fertilizers, etc.

It is also known that the subsoil quality, and in particular the aquifers quality, is compromised by storage of wastes, fuels and chemical products, by the migration of substances spread in the atmosphere and falling on the ground, and by the release of substances, even harmless, suitable to trigger some chemical or physical processes, or microorganism-mediated processes, which generate an increase of mobility of toxic substances or of substances with an anthropic origin, or of carcinogenic substances naturally present in the aquifers, such as for example contaminations from arsenic or other heavy metals.

The reclamation of subsoil in general, and of aquifers in particular, is often difficult due to the high depth of contamination and the high volumes to be treated, which often make excavation and disposal operations in a tip, scarcely economical and technically unfeasible.

Injection techniques are known, which are aimed to reclamation and decontamination of polluted sites, characterized by driving into the subsoil substances, which are able to degrade the contaminants and/or to accelerate their removal or reduce their toxicity, by generating reactive zones.

A first known mode for performing the injecting techniques is providing to inject reagents inside traditional piezometers (or wells) equipped with single or double packers, suitable to prevent the reagents/amendants from going out of the pipe itself. The piezometers are equipped with screen adapted to make the reacting material go out and a blind section above, cemented to prevent the reflow of reacting material along preferential pathways with higher hydraulic conductivity. The disadvantages of the injecting technique mainly consist in the non-homogeneous distribution of the reacting product in the subsoil, and in the impossibility of selectively injecting the reacting product at the selected depths.

A second known mode for performing the injecting techniques is providing for the use of direct push systems, which allow injecting the reacting products directly inside rods during the perforation step, like the one, for example, disclosed in U.S. Pat. No. 5,133,625.

Moreover, the perforation rods, coupled with suitable pumps, allow reaching high injecting pressure values, and allow an injection mode of the reacting products from bottom to top, in which the perforation rods are firstly planted down the maximum injecting depth and then lifted simultaneously with the action of the pump for injecting the reacting product; the product injection goes on at the same depth till one reaches the reacting product volume required in the technical project specifications, and possibly the perforation rods are again lifted till the following injection range. With the mode, the reagent is not homogeneously distributed and tends to get accumulated in the aquifer layers provided with higher permeability. Finally, the perforation rods also allow an injection mode of the reagent from top to bottom, in which the perforation rods are planted at the minimum injecting depth and the reacting product is injected into the ground till the desired volumes are reached, the rods being then further planted in the ground and the procedures of injecting the reagents are repeated, this step being repeated till the selected depth is reached. With the injection mode, the reagent is uniformly distributed along the vertical injection line, but more slowly in the layers with lower permeability.

The injection by direct push system has a maximum limit of perforation depth as function of the types of grounds being found: consequently, the use of the planting rods does not guarantee to reach the desired depth necessary for injecting the reacting product.

It is known that the reacting products perform their properties in wide time ranges: therefore, following injections in time are necessary, which imply the need of repeating the perforation operation, with a strong increase of costs.

A third injection mode is also known, such as dosing on the water table of the aquifer, initially performed through a suitable excavation to emerge the aquifer by about 50 cm, and afterwards by dividing the excavation into sectors by making ground curbs, for the correct dosing of the reacting mixture. Wetting of the product with grid follow, by directing the jet of mixture parallel and then perpendicular to the excavation edges till the mixture is finished. The same modes are then performed on the following sector part; when the dosing activities for the reacting product are ended, closing is performed for the sectors through a re-closure of the excavation with an excavator.

It is clear how the use of the injection modes is limited only to localized and surface contaminations, not being able to reach the different depth of aquifer or of subsoil.

A last injection mode is also known, which consists in emplacing permeable reactive barriers, by making an excavation of trenches, afterwards filled with reactive material at solid state, such as for example zero-valent iron, like the one disclosed in U.S. Pat. No. 5,266,213. The reactive material is crossed by contaminated water which moves due the effect of the natural hydraulic gradient.

The reagents emplacing technics do not easily allow reaching high depths, and has are characterized by design and construction costs which are higher than those related to the other, above described methodologies.

Injection procedures and systems are also known in the art, which are related to the geotechnical consolidation, such as for example:

WO2008123674, in which a system is disclosed for injecting a concrete mixture equipped with an injection piping, which allows injecting into the subsoil only products adapted to consolidate the subsoil;

EP0623708, which discloses a system for injecting a concrete mixture equipped with a valve pipe and with an electronic device arranged along the tube, suitable to monitor the behaviour of the injections. The system has only the features as to reduce at a minimum the interferences with the electronic device, such as for example the injecting tube made of materials permeable to electromagnetic waves;

FR2444873, which discloses a device equipped with a ball which, under the injection thrust of the injected solidifying liquid, flows downwards, opening the injection hole of the first tube section, thereby allowing the concrete mixture to go out. With the increase of pressures, the deformable ball falls in the below tube sections, having smaller and smaller diameters, and opening, when the pressure increases, the deeper injection holes. The device allows selectively injecting at the desired depths, but do not allow checking the amounts of injected product, since, when the ball slides downwards, due to the pressure increase, the above hole remains open and injection in the above layers is repeated many times;

U.S. Pat. No. 4,442,895, which discloses a method for fracturing the ground and a pressurizing system suitable for reaching the pressure values as to enable fracturing. Fracturing of the surrounding ground is performed through the method, but does not prevent a diffusion along preferred ways for a possible injected concrete mixture;

FR2552462, which discloses a system for injecting concrete, resins, liquids, through the use of a threaded pipe equipped with holes for injecting materials for consolidating the ground. The system is equipped with valves integrated in the injection piping by melting when making the pipe, or by a following mechanical working;

U.S. Pat. No. 5,624,209, which discloses a methodology for injecting fluids in the ground through two coaxial piping, inserted into the ground down to a desired depth, each piping being equipped with holes in the terminal part of the piping. The methodology cannot be used in relation to aquifers, enabling the rising of aquifer water inside the piping; moreover, the methodology cannot be used for the selective injection at the desired depths since the coaxial piping are equipped with a single injection hole.

It is clear that the above systems and procedures related exclusively to consolidate the grounds are characterized by components composed of materials preferably suitable for the purpose of consolidating the grounds, and which does not allow a selective injection at the desired depths and do not ensure an optimum injection free from reflows and dispersions of the injected product, mandatory feature in the injection processes of reacting products for reclaiming contaminated sites.

JP-A-2010 063978 discloses an injection process free from hollow spaces and operating due to the mutual cooperation of an external injection pipe with entries and an injection pipe inside it.

Therefore, object of the present invention is solving the above prior art problems, by providing a process for treating contaminated subsoil, and contaminated aquifers and/or capillary fringes.

A further object of the present invention is providing a treatment process capable of selectively injecting an amount of reacting products at the required project depths.

SUMMARY OF INVENTION

A process for treating contaminated subsoil is provided that includes arranging at least one hole in contaminated subsoil, inserting at least one piping into the at least one hole, the at least one piping being longitudinally equipped with at least one first valve; inserting or arranging at least one injecting means into the at least one piping, and injecting at least one fluid into the contaminated subsoil through the at least one injecting means and next to the at least one first valve in open configuration; and removing possible residuals present in the at least one piping following the injection of the at least one fluid.

DETAILED DESCRIPTION OF THE INVENTION

The above and other objects and advantages of the invention, as will result from the following description, are obtained with a process for treating contaminated subsoil, and contaminated aquifers and/or capillary fringes. Preferred embodiment and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) could be made to what is described, without departing from the scope of the invention, as will appear from the enclosed claims.

The present invention will be better described by some preferred embodiments thereof, provided as a non-limiting example, with reference to the enclosed drawings, in which FIGS. 1 to 5 show schematic side sectional views of some steps for implementing a preferred embodiment of the process for treating contaminated subsoil according to the present invention.

Figure 1:
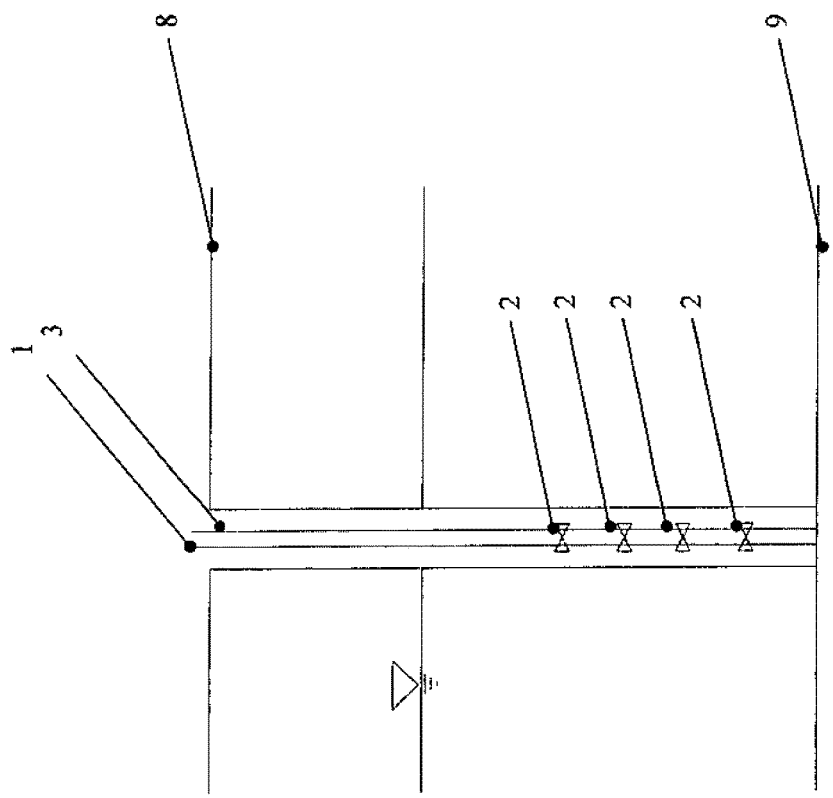
FIG. 1 is a cross sectional view of an inventive process for treating contaminated subsoil according to one embodiment of the invention.
Figure 2:
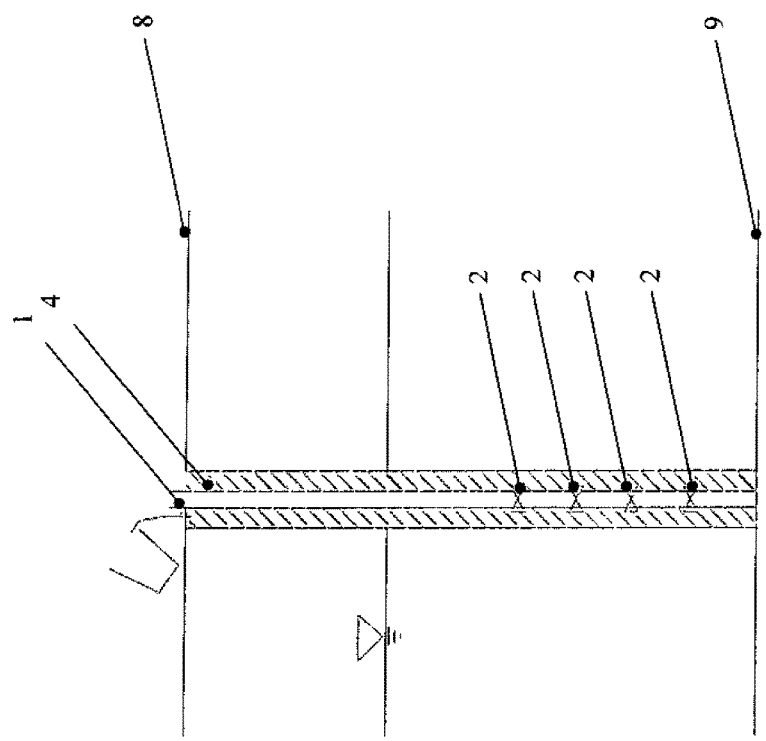
FIG. 2 is a second cross sectional view of an inventive process for treating contaminated subsoil depicting at least one hollow space interposed between at least one external surface of the piping and at least one internal surface of the hole according to one embodiment of the invention.
Figure 4:
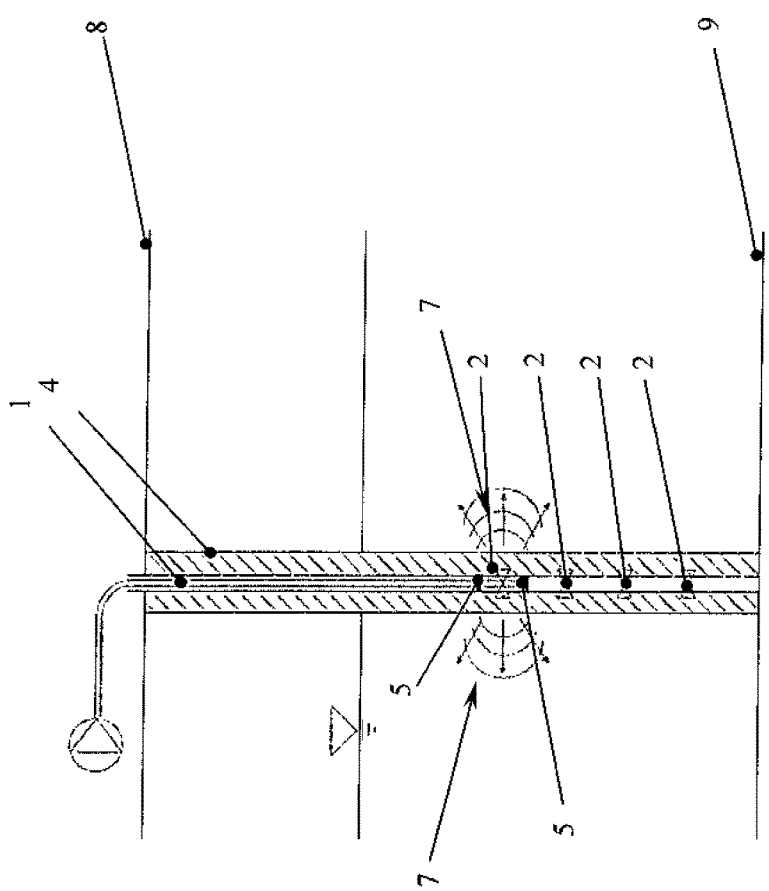
FIG. 4 is a fourth cross sectional view of an inventive process for treating contaminated subsoil depicting the at least one shutter device adapting to at least one of a pressure and an injection flow-rate value to enable at least one passage from a closed configuration to an open configuration, and vice versa.

With reference to the Figures, it is possible to note that the process of injecting reagents or amendants for treating contaminated subsoil, and also contaminated aquifers and/or capillary flanges according to the present invention comprises the steps of:

arranging at least one hole 3, such as for example a vertical, horizontal or inclined hole in the subsoil, crossing the subsoil or the aquifer from a natural level 8 till a terminal depth 9 required by the project; the hole 3 can be obtained through any drilling technique suitable for the object of the present invention, such as, for example, a rotation, or a percussion, or a direct push, or a rotary percussion, or a sonic-drilling;

inserting into the hole 3 at least one piping 1 of a preset length, longitudinally equipped with at least one first valve 2, such as, for example a non-return valve, placed along the piping 1, as shown for example in FIG. 1;

possibly, arranging at least one hollow space 4 interposed between at least one external surface of the piping 1 and at least one internal surface of said hole 3, as shown for example in FIG. 2;

inserting or arranging at least one injecting means into said piping 1;

injecting 7 at least one fluid, into the subsoil, and preferably in the aquifer, through the injecting means, next to the first valve 2 in open configuration, as shown for example in FIG. 4;

removing the possible residuals present in the piping 1 following the injections 7 of the fluid.

The process is adapted to decontaminate the subsoil, by injecting, even selectively or at one or more different depths included between the natural level 8 and the terminal depth 9, an amount of the fluid through the first valve 2.

Figure 5:
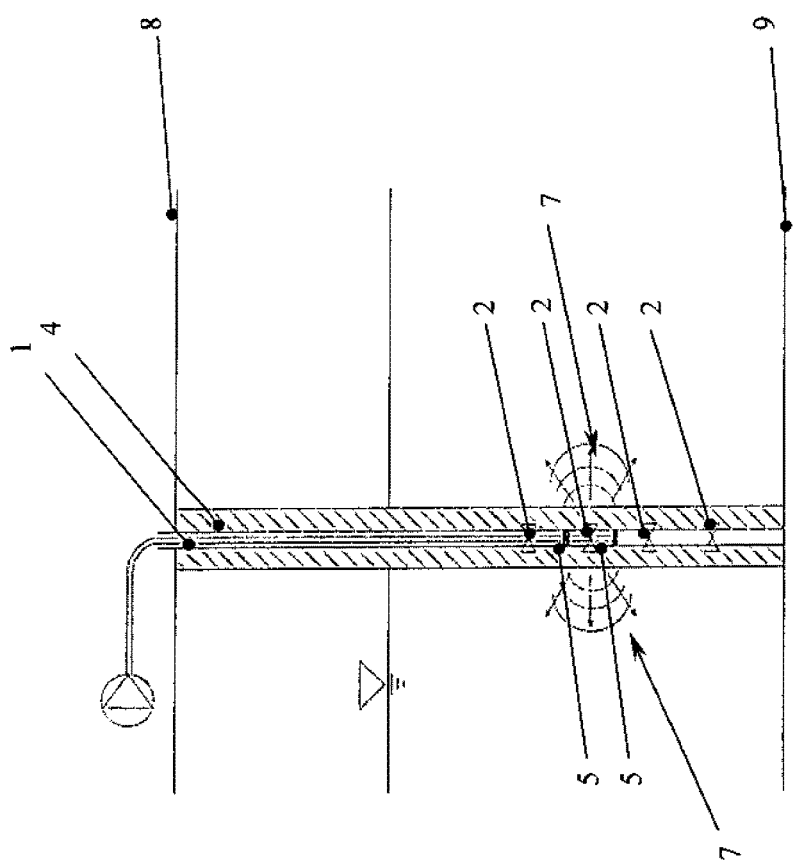
FIG. 5 is a fifth cross sectional view of an inventive process for treating contaminated subsoil according to one embodiment of the invention.

Possibly, the process according to the present invention can further comprise the steps of:

moving the injecting means along a longitudinal axis of the piping 1;

positioning the injecting means next to at least one second valve 2;

injecting 7 the fluid into the subsoil, and preferably into the aquifer, through the injecting means, next to the second valve 2 in open configuration, as shown for example in FIG. 5;

possibly, repeating the two previous steps next to at least one third valve 2. Possibly the first, second and third valve 2 are respectively arranged along the piping 1 for a preset length at established intervals.

The fluid injected into the subsoil or aquifer is preferably a mixture of homogeneous or heterogeneous reacting products, such as, for example, liquids, or gas-oversaturated liquids, or foams, or emulsions, or solid foams, or gels, or suspensions of particles; moreover, the fluid is characterized by a Newtonian or non-Newtonian, viscous or viscous-elastic rheological behaviour and can contain surface-active components, co-solvents, reactive components, possibly inert solid particles, oxidants, reducing agents, dispersing gases and fluids, adsorbents, and solutes adapted to biodegrading or interacting with possible contaminants present in the subsoil or aquifer.

The process according to the present invention can further comprise a step of sealing the hollow space 4 through, for example, a preset sealing, made first by inserting the piping 1 inside the hole 3, through the use of bentonite products or of packers arranged externally to the piping 1, or for example, a waterproofing in situ, as shown in FIG. 2, through the insertion due to gravity inside the hollow space 4 of a cement or bentonite suspension or granular bentonite; moreover, the sealing is obtained by injecting inside the hollow space 4, at a certain pressure value, a sealing mixture through the first valve 2, and possibly through the second and third valve 2, of the piping 1 after having inserted the piping 1 into the hole 3. Injection of the sealing mixture is performed through the help of known partialization systems of the piping 1 till the mixture goes out of the natural level 8. It is necessary to wait for a certain time interval aimed to the complete hydration of the bentonite material or the drying of the used waterproofing mixture.

The sealing of the hollow space 4 has the purpose of preventing a rise of the fluid along the piping 1, and of preventing the fluid from flowing along paths with a higher hydraulic conductivity, possibly being formed during the drilling procedure. Moreover, the cement or bentonite or granular bentonite suspension, given its mechanical strength features due to its composition, will be easily fractured by the injecting pressure, thereby allowing the expansion of fluid in the subsoil or in the aquifer to be decontaminated.

Figure 3:
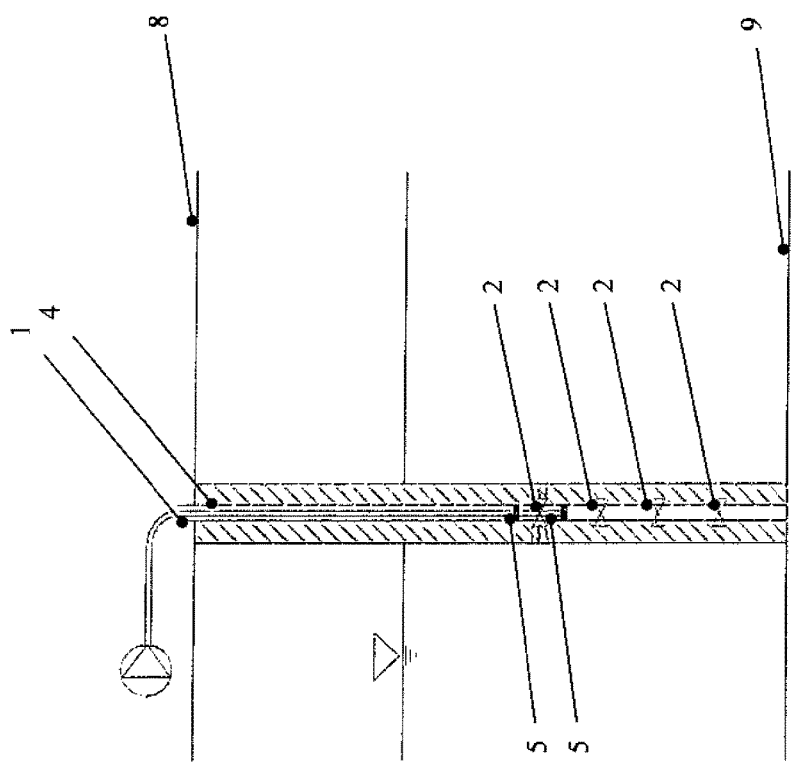
FIG. 3 is a third cross sectional view of an inventive process for treating contaminated subsoil depicting at least one shutter device according to one embodiment of the invention.

As shown for example in FIG. 3, the fracturing of the hollow space 4 can be urged by a procedure of activating the first valve 2, and possibly the possible further valves 2, adapted to enable a communication between the piping 1 and the subsoil, or the aquifer, by injecting a fluid, preferably water, through a shutter device 5 which can be dilated and reversible, such as for example a double or single packer.

The injecting means are adapted to inject 7, into the subsoil and into the aquifer, through the first valve 2, and possibly through the possible further valves 2, in open configuration, the fluid in predefined amounts depending on the depths 9 required by the project. As shown for example in FIGS. 3, 4 and 5, the first valve 2, and possibly the possible further valves 2, is upwards and downwards delimited by the shutter device 5, the shutter device 5 being adapted, depending on at least one value of the injecting pressure and flow-rate 7, to enable the passage from the closed configuration to the open configuration, and vice versa, for the first valve 2, and possibly for the further valves. Obviously, if it is necessary to inject from all valves simultaneously, the lower shutter device would not be necessary.

The process according to the present invention is therefore highly efficient, being it possible to perform multiple injections of the fluid through at least the valves 2. In particular, it is possible to perform multiple injections ensuring a cleaning of the piping 1 and of the valves from possible residuals of the previous injection.

The components used during the process according to the present invention, in particular the piping 1, the shutter device 5 and the valve 2, and possibly the further valves 2, are composed of materials resisting to known contaminants and N capable of operating at high pressures. The materials, such as for example PVC, or HDPE, or stainless steel, Teflon, rubbers, elastomers, etc., used for making the present invention, have been obtained and studied for this purpose and have been subjected, by the Applicant, to laboratory tests for determining their mechanical characteristics, and their resistance to atmospheric agents, hydrocarbons, solvents, oils, heat and low temperatures.

Herein below a description will be given of the decontamination activities activated on two aquifers by using the process according to the present invention.

The first activity provides for the decontamination from chlorinated aliphatic hydrocarbons, with a width of about 35 m and depths included between 14 and 34 m from the natural level, of an aquifer characterized by a gravely-sandy matrix, with hydraulic conductivity of about $5 \times 10^{-4}$ m/s, and hydraulic gradient of about 0.4%.

Seven verticals for multiple injection are arranged, each point characterized by a piping equipped with 18 valves for injecting 43 tons of a muddy mixture with water base with biopolymers and iron particles adapted to confer it a non-Newtonian rheological behaviour, for a total of 130,000 l of mixture.

Under application conditions, the high contamination depth does not allow using known injecting techniques.

The use, under application conditions, of the process according to the present invention allows performing injections at high depths, performing repeated injections of the fluid in wide time intervals, and guaranteeing the functionalities of the components under highly polluting conditions, like the one described above.

Herein below, the steps will be described which characterize the process for decontaminating the aquifer from chlorinated aliphatic hydrocarbons, according to the present invention:

arranging a hole whose diameter is 101/127 mm through rotary drilling at a depth of 34 m from the ground surface;

inserting and installing a piping equipped with non-return valves placed along the length of the piping at pre-established intervals between 14 and 34 m from the natural level;

arranging a sealed hollow space interposed between the external surface of the piping and the internal surface of the hole;

preparing the fluid through the use of a mixing and injecting plant equipped with 2 tanks whose capacity is 200 l each;

inserting, on the bottom of the piping, an injecting means, adapted to selectively inject at the depths required by the project;

activating two valves, included between the two shutter devices;

injecting the fluid next to the two open valve with a pressure value, included in a range between 0.5 and 40 bar, allowing to inject the amount of desired product for each depth;

moving the injecting means on 2 valves overlapping the previous ones and repeating the two previous steps;

repeating the two previous steps for the following valves;

removing the residuals of the injected product ensuring the functionality of the station for the following injection.

The above described process is applied to all seven points arranged for decontaminating the aquifer.

After about one month from the injection step, bacteria are inoculated in each of the stations, increasing the amount of bacteria present in the environmental matrix and enabling the removal of the contaminant.

The second activity provides for the decontamination, from chlorinated solvents and aromatic hydrocarbons, of an aquifer characterized by a sandy matrix, with hydraulic conductivity of about $4 \times 10^{-4}$ m/s, and upper confined by a layer of clay, as an average 7-8 m thick.

Three injection points are arranged inside an industrial plant and, for each station, 3 injections are performer with a mixture of water and slow oxygen release substances.

Initially, injection through traditional piezometers has been used as decontamination technique for the aquifer, but the injected mixture reflowed and rose along the piezometer walls and along the gravel pack in the hollow space between the hole and the well piping, moving along the preferential ways; moreover, the mixture, being dispersed, did not release enough amounts of oxygen inside the aquifer to be decontaminated; finally, an amount of the injected mixture is deposited on the bottom of the piezometric piping, being the piezometric piping not equipped with non-return valves, usually adapted to avoid the reflow of the injected produce inside the piezometer or of the piping.

Under application conditions and in view of the difficulties encountered by using the injecting technique in traditional piezometers, the process according to the present invention is performed, which provides for the following steps:

perforating a hole whose drilling diameter is 101/127 mm through a rotation probe at 20 m of depth from the natural level;

inserting and installing a piping whose diameter is 1"½ equipped with 12 non-return valves placed along the piping every 50 cm, from 14.25 m to 19.75 m from the natural level;

arranging a sealed hollow space interposed between the external surface of the piping and the internal surface of the hole;

preparing the mixture of reacting products, 126 kg of reacting product mixed with 600 l of water, through the use of a mixing and injecting plant equipped with 2 tanks, each with a capacity of 200 l;

inserting, on the bottom of the piping, an injecting means, adapted to selectively inject at the desired depths;

activating 3 valves included between two shutter devices;

injecting, with a certain pressure value, fluid next to the 3 valves, allowing to inject the amount of desired product for each depth;

moving the injecting means on 3 valves overlapping the previous ones and repeating the two previous steps repeating the two previous steps for the following valves;

removing the residuals of the injected product ensuring the functionalities of the station for the following injection.

The invention has the following advantages:

enabling the injection into the subsoil or the aquifer of a selected amount of reacting products at designed depths;

avoiding daylighting of products injected into the subsoil or the aquifer, inside a piping inserted into a suitable hole;

allowing the single or multiple injections of reagents into the subsoil;

allowing the injection into the subsoil of products by low pressure permeation and/or by preferential flow at high injection pressure;

allowing the injection of products also inside porous, fractured or karst aquifers;

enabling to perform vertical, horizontal, or inclined probing in the subsoil or the aquifer;

allowing the installation of a valve-type piping also when there are environmental aquifer or matrixes which are highly polluted by aggressive contaminants, guaranteeing the functionalities of materials in time.

The invention claimed is:

1. A process for treating a contaminated subsoil, characterized in that it comprises the steps of:
arranging at least one hole (3) in said subsoil;
inserting into said hole (3) at least one piping (1), said piping (1) being longitudinally equipped with at least one first non-return valve (2);
arranging at least one hollow space (4) interposed between at least one external surface of said piping (1) and at least one internal surface of said hole (3), said at least one hollow space (4) being free from filler material;
inserting or arranging at least one injecting means into said piping (1);

moving said injecting means along a longitudinal axis of said piping (1);

positioning said injecting means next to at least one second valve (2);

selectively injecting (7) at least one fluid into said subsoil at a specified depth, through said injecting means, next to said first non-return valve (2) in open configuration;

successively repeating said two previous steps next to said at least one second valve (2) and next to at least one third valve (2); and removing possible residuals present in said piping (1) following said injections (7) of said fluid, said residuals being at least one of liquids, gas-oversaturated liquids, foams, emulsions, solid foams, gels, suspensions of particles, surface-active components, co-solvents, reactive components, inert solid particles, oxidants, reducing agents, dispersing gases and fluids, absorbents, solutes, reagents, amendments, and combinations thereof.

2. The process according to claim 1, characterized in that said fluid is a mixture of reacting products.

3. The process according to claim 1, further comprising at least one step of sealing said hollow space (4), said sealing being adapted to prevent a rise of said fluid along said piping (1), preventing said fluid from flowing in at least one path at higher hydraulic conductivity formed during said step of arranging said hole (3).

4. The process according to claim 1, characterized in that said piping (1) crosses said subsoil from at least a natural level (8) till a terminal depth (9).

5. The process according to claim 1, characterized in that said first valve (2) is placed along said piping (1) for at least one preset length at established intervals.

6. The process according to claim 5, characterized in that said first valve (2) is upwards and downwards delimited by at least one shutter device (5).

7. The process according to claim 6, characterized in that said at least one shutter device (5) is adapted, depending on at least one pressure and flow-rate value of said injection (7), to enable at least one passage from a closed configuration to said open configuration, and vice versa, for said first valve (2).

8. The process according to claim 1, characterized in that said injecting means injects into said subsoil, through said first valve (2) in said open configuration, said amount of said fluid depending on said terminal depth (9).

9. The process according to claim 1, further comprising at least one step of activating said first valve (2), through the injection of at least one fluid product through said at least one shutter device (5), adapted to perform at least one fracturing of said hollow space (4), enabling a penetration of said fluid into said subsoil.

10. The process according to claim 1, characterized in that said at least one first, at least one second, and/or at least one third valves (2) are arranged along said piping (1) for at least one preset length at pre-established intervals.

* * * * *